(12) United States Patent
Björn et al.

(10) Patent No.: US 10,108,198 B2
(45) Date of Patent: Oct. 23, 2018

(54) LIFT/COLLISON DETECTION

(71) Applicant: HUSQVARNA AB, Huskvarna (SE)

(72) Inventors: Jonathan Björn, Jönköping (SE); Anders Sjögren, Forserum (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/561,393

(22) PCT Filed: Mar. 26, 2015

(86) PCT No.: PCT/EP2015/056513
§ 371 (c)(1),
(2) Date: Sep. 25, 2017

(87) PCT Pub. No.: WO2016/150510
PCT Pub. Date: Sep. 29, 2016

(65) Prior Publication Data
US 2018/0107224 A1    Apr. 19, 2018

(51) Int. Cl.
*A47L 5/00*    (2006.01)
*G05D 1/02*    (2006.01)
*A01D 34/00*    (2006.01)

(52) U.S. Cl.
CPC ......... *G05D 1/0227* (2013.01); *A01D 34/008* (2013.01); *G05D 2201/0208* (2013.01); *G05D 2201/0215* (2013.01)

(58) Field of Classification Search
CPC ... G05D 2201/0215; G05D 2201/0208; G05D 1/0227; F16C 32/044; A47L 2201/04; A47L 11/4011; A47L 9/2805; G01C 21/16
(Continued)

(56) References Cited

U.S. PATENT DOCUMENTS 6,184,640 B1 *  2/2001  Kawashima .............. H02P 1/04
                                                  310/48
6,498,410 B1 * 12/2002  Yashiro ................. F04D 19/048
                                                  310/90
2015/0265121 A1 *  9/2015  Kim ....................... H02K 21/16
                                                  15/319

FOREIGN PATENT DOCUMENTS

EP    2425700 A2    3/2012
EP    2692220 A1    2/2014
(Continued)

OTHER PUBLICATIONS

International Search Report and Written Opinion for International Application No. PCT/EP2015/056513 dated Nov. 23, 2015, all enclosed pages cited.
(Continued)

*Primary Examiner* — Dalena Tran
(74) *Attorney, Agent, or Firm* — McNair Law Firm, P.A.

(57) ABSTRACT

A robotic work tool system (200) comprising a robotic work tool (100) comprising a lift/collision detection sensor (190), said lift/collision detection sensor (190) comprising a polarity element (191) and at least a first sensing element (192') and a second sensing element (192"), wherein the polarity element (191) has a first and a second polarity and wherein the first and second sensing elements are configured to each sense a polarity of the first polarity element (191). The robotic work tool (100) is configured to detect a polarity change in the first sensing element (192') and in the second sensing element (192") and in response thereto determine that a lift has been detected, or detect a polarity change in the first sensing element (192') but not in the second sensing element (192") and in response thereto determine that a collision has been detected.

15 Claims, 5 Drawing Sheets

(58) Field of Classification Search
USPC .......... 700/258; 318/461, 491; 15/319, 358; 310/90.5
See application file for complete search history.

(56) References Cited

FOREIGN PATENT DOCUMENTS

| EP | 2803255 A1 | 11/2014 |
|---|---|---|
| WO | 03103375 A1 | 12/2003 |
| WO | 2013125995 A1 | 8/2013 |
| WO | 2014007728 A1 | 1/2014 |

OTHER PUBLICATIONS

International Preliminary Report on Patentability for International Application No. PCT/EP2015/056513 dated Sep. 26, 2017, all enclosed pages cited.

* cited by examiner

|  | S1 | S2 | S3 | S4 |
|---|---|---|---|---|
| Normal mode | - | - | - | - |
| Collision mode | + | + | + | - |
|  | + | + | - | + |
|  | + | - | + | + |
|  | - | + | + | + |
|  | + | + | - | - |
|  | + | - | + | - |
|  | + | - | - | + |
|  | - | + | + | - |
|  | - | - | + | + |
|  | - | + | - | + |
|  | + | - | - | - |
|  | - | + | - | - |
|  | - | - | + | - |
|  | - | - | - | + |
| Lift mode | + | + | + | + |

LIFT/COLLISON DETECTION

TECHNICAL FIELD

This application relates to a method and a robotic work tool system for an improved detection of collisions and lifting of a robotic work tool, and in particular to a method and a robotic work tool for improved differentiation between detecting a collision and detecting a lifting of the robotic work tool.

BACKGROUND

Contemporary robotic work tools are designed to operate in areas with obstacles, permanent and temporary. One example being a garden with a fountain in it. The fountain may not be marked with a boundary marker and the robotic work tool should be able to detect that it has collided with the obstacle so that it can continue to operate in another direction instead of coming to a standstill while pushing against the fountain. The collision detection thus influence an operating pattern of the robotic work tool and affects the ongoing operation (such as through a change in direction), but does not discontinue the operation.

Furthermore, many robotic work tools, such as lawnmower robots, carry work tools, such as cutting blades, that may injure or cause damage if not handled properly. A common problematic situation occurs when a user lifts a robotic work tool to move it from one area to another, or perhaps just to change direction, when the user may become exposed to the work tool. It is thus of importance for safety reasons that the robotic work tool is able to detect that it is being lifted, also for partial lifts, and at least temporarily deactivate any work tool. The lift detection thus, at least temporarily interrupts the operation of the robotic work tool and it is important to distinguish between these two detections.

For these reasons many robotic work tools are arranged with both collision detection sensors and lift detectors. Having two sensors for each action results in that a robotic work tool needs to have many detectors especially to be able to detect collisions in all directions and also to detect partial lifts in different parts or corners of an robotic work tool.

One manner of detecting collisions is disclosed in the international patent application published as WO 03/103375. The application discloses a self-propelling device, preferably a self-propelling lawn-mowing robot comprising at least a control and navigational control system that in conjunction with outer influence on the device, for instance collision with an object, at least by information from one or several sensors placed in or on the device, controls the movements of the device across a surface area. The device is designed so that at least a first part of the device moves in relation to the device's remaining parts in conjunction with the outer influence. The device is so designed that the first part of the device moves in relation to the device's remaining parts in conjunction with outer influence. The self-propelling robot comprises a sensor that detects the movements of the first part without being in contact with the first part. Two main embodiments are disclosed with reference to (mainly) FIGS. 11 and 13. The first embodiment (FIG. 11) is directed at detecting collisions as is clearly stated on page 6, line 11. The second embodiment (FIG. 13) is directed at detecting lifts (or crossing a hollow) as is clearly stated on page 7, lines 10-12. In the first embodiment the sensor arrangement is arranged close to the rear wheels. In the second embodiment the sensor arrangement is arranged close to the front wheels (compare with FIG. 10 for location of components). Thus, the disclosure teaches to use one setup to detect a collision and one setup to detect a lift/crossing a hollow. These two embodiments would not be possible to combine without significant modification.

Even though the problems above have been discussed for lawnmower robotic work tools, the same or similar problems exist also for other robotic work tools.

There is thus a need for a manner of detecting both collisions and lifts without requiring too many sensors.

SUMMARY

It is an object of the teachings of this application to overcome the problems listed above by providing a robotic work tool system comprising a robotic work tool comprising a lift/collision detection sensor, said lift/collision detection sensor comprising a polarity element and at least a first sensing element and a second sensing element, wherein the polarity element has a first and a second polarity and wherein the first and second sensing elements are configured to each sense a polarity of the first polarity element. The robotic work tool is configured to detect a polarity change in the first sensing element and in the second sensing element and in response thereto determine that a lift has been detected, or detect a polarity change in the first sensing element but not in the second sensing element and in response thereto determine that a collision has been detected.

It is beneficial to be able to accurately determine if a lift and/or a collision has occurred in order for the robotic work tool to take the appropriate action (e.g. deactivate or stop the robotic work tool if a lift is detected and change a direction of movement if a collision is detected). Hence, an accurate determination between a lift and a collision increases the effectiveness of the work tool as well as increasing the safety of the user.

In one embodiment the robotic work tool is a farming equipment, a vacuum cleaner, a floor cleaner, a street sweeper, a snow removal tool, a golf ball retriever robot, a cleaner robot, a leaves blower robot, a leaves collector robot, snow thrower robot or a mine clearance robot.

It is also an object of the teachings of this application to overcome the problems listed above by providing a method for use in a robotic work tool system comprising a robotic work tool comprising a lift/collision detection sensor, said lift/collision detection sensor comprising a polarity element and at least a first sensing element and a second sensing element, wherein the polarity element has a first and a second polarity and wherein the first and second sensing elements are configured to each sense a polarity of the first polarity element. The method comprises detecting a polarity change in the first sensing element and in the second sensing element and in response thereto determine that a lift has been detected, or detecting a polarity change in the first sensing element but not in the second sensing element and in response thereto determine that a collision has been detected.

The inventors of the present invention have realized, after inventive and insightful reasoning that by arranging an array of for example Hall sensors in one part of the robotic work tool, such as the chassis, and a magnet in another part of the robotic work tool, such as the body, it is possible to detect a switch in the magnetic field causing a polarity change due to the relative movement of the magnet in relation to the array of sensors, and based on this polarity change determine whether a collision or a lift has been detected by using only one lift/collision detection sensor, only having one magnet.

One benefit lies in that only detecting switches in the magnetic field and not for example a decreasing field strength, a more robust design could be achieved since only a small movement between the parts of the robotic work tool is needed to detect a polarity change and thus determine a collision or a fall. Furthermore, a decrease in field strength could have several reasons and is thus not as accurate as only detecting a switch in the magnetic field.

A further benefit lies in that the assembly time and cost for manufacturing, and also maintaining, a robotic work tool is reduced by integrating many sensor arrangements into one sensor for detecting both collisions and lifts.

Yet another benefit lies in that the robotic work tool can determine from which side a collision occurs. This would not be possible using the arrangements of the WO 03/103305 disclosure as a side collision would cause all collision detecting magnets to move away from their respective sensors.

It should be noted that even though the teachings herein are focussed on detecting and differentiate between a lift or a collision, the teachings can also be used for detecting either a collision or a lift. A collision or lift may then be detected by a change in polarity. For example, a lift detection sensor for a robotic work tool may be arranged in the middle of a robotic work tool and any detected change in polarity may then indicate (at least) a (partial) lift even if not all sensors detect a polarity change.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
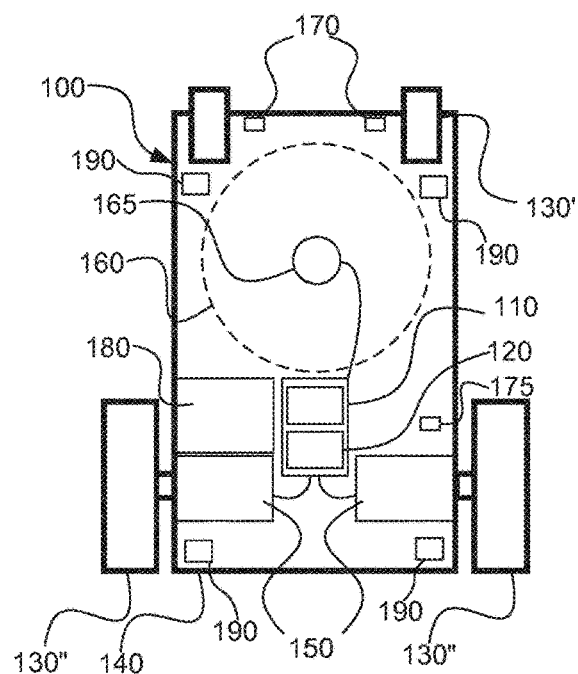
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are driveable connected to at least one electric motor 150. It should be noted that even if the description herein is focussed on electric motors, combustion engines may alternatively or additionally be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 further may have at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

It should be noted that the teachings herein may also be used for a robotic work tool 100 that is configured to operate in a work area, where the work area is not bounded by a boundary wire. Examples of such robotic work tools 100 are tools arranged to physically detect a boundary by collision detection, or a robotic work tool 100 that uses a position determination system (such as GNSS) to maintain a position within the work area, which work area is specified by coordinates.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller 110 is also configured to determine the load exerted on the rotating blade, by for example measure the power delivered to the cutter motor 165 or by measuring the axle torque exerted by the rotating blade. The robotic work tool 100 is, in one embodiment, a lawnmower robot. In one embodiment the robotic work tool 100 is a farming equipment. In one embodiment the robotic work tool 100 is a golf ball collecting tool.

The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

The robotic work tool 100 also has (at least) one battery 180 for providing power to the motors 150 and the cutter motor 165. Alternatively or additionally the robotic work tool may have a fuel tank 180 for supplying fuel to any other type of engine 150.

The robotic work tool 100 also comprises at least one lift/collision detection sensor 190, which is also configured to detect a lifting event, that is to detect that the robotic work tool is being (at least partially) lifted. In the embodiment shown in FIG. 1 the robotic work tool 100 comprises four lift/collision detection sensors 190, but it should be understood that the robotic work tool may be arranged with any numbers of sensors. The lift/collision detection sensor 190 and its arrangement in the robotic work tool 100 will be described in further detail with reference to FIG. 3.

Figure 2:
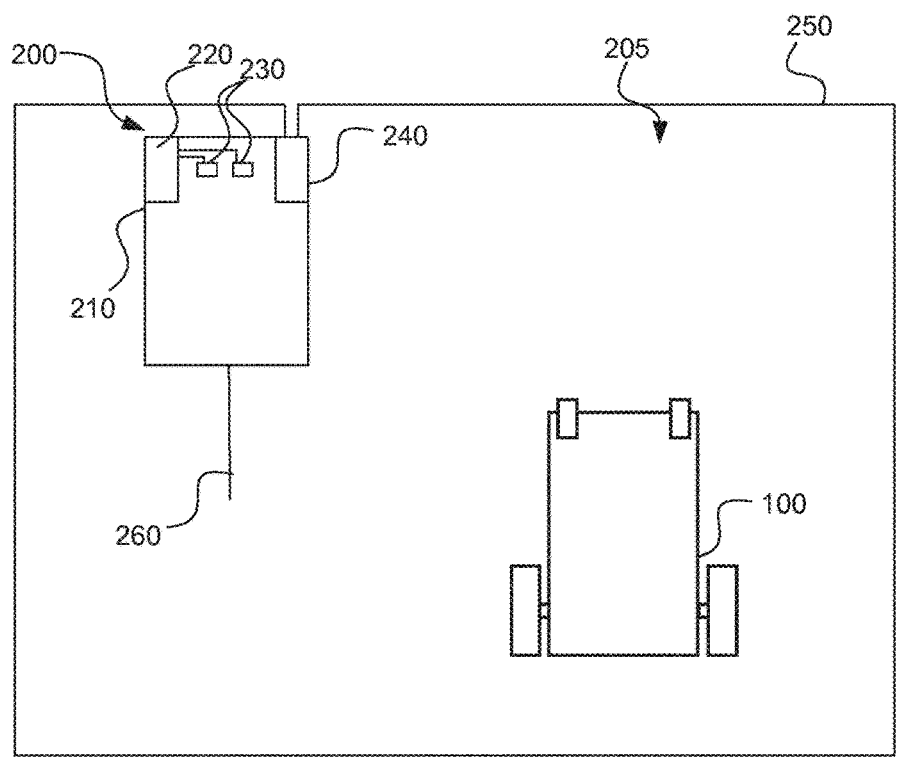
FIG. 2 shows a schematic view of a robotic working tool system according to one embodiment of the teachings of this application.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to service. As stated above, the robotic work tool 100 may be arranged to operate solely using the position determining device in which case no boundary wire 250 nor signal generator (to be disclosed) is part of the robotic work tool system 200. The charging station 210 has a charger 220 coupled to, in this embodiment, two charging plates 230. The charging plates 230 are arranged to co-operate with corresponding charging plates (not shown) of the robotic work tool 100 for charging the battery 180 of the robotic work tool 100. The charging station 210 also has, or may be coupled to, a signal generator 240 for providing a control signal (not shown) to be transmitted through the boundary wire 250. Optionally, the charging station 210 also has a guide cable 260 for enabling the robotic work tool to find the entrance of the charging station 210.

Figure 3:
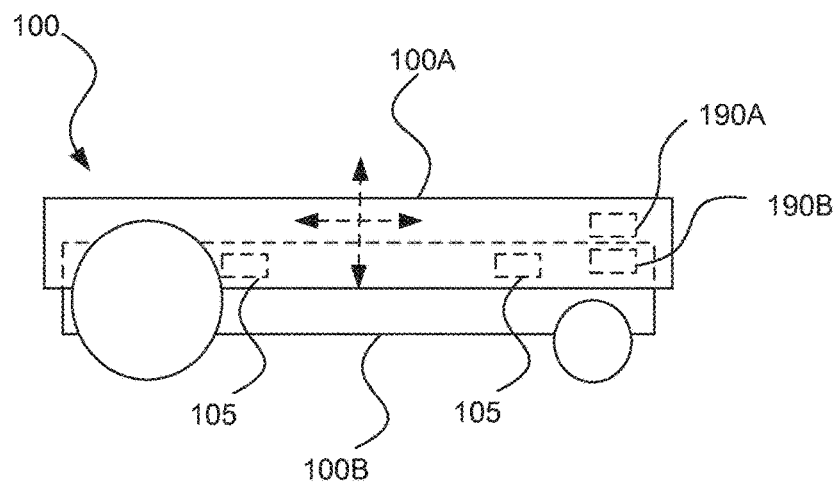
FIG. 3 shows a schematic view of a robotic work tool arranged with a lift/collision detection sensor 190 according to one embodiment of the teachings of this application.

FIG. 3 shows a schematic view of a robotic work tool 100 arranged with a lift/collision detection sensor 190 according to the teachings herein, even if only one sensor is shown in FIG. 3, it should be understood that a robotic work tool may be arranged with a plurality of sensors, for example; as is shown in FIG. 1. As can be seen the robotic work tool 100 further comprises a body 100A and a chassis 100B. The body 100A is arranged to be removably attached to the chassis 100B. The body 100A is further arranged to be movable with respect to the chassis 100B as illustrated by the dashed arrow in FIG. 3. The body 100A may be attached to the chassis 100B by means of elastic fittings 105, such as rubber bushings. Such an arrangement also reduces the wear and tear of the robotic work tool 100 as the elastic fittings will absorb some of the collision forces.

The body 100A is movable both in a direction in a same plane as a direction of movement of the robotic work tool 100 as well as in a direction perpendicular to such a plane. In other words, the body 100A is movable both in a forwards/backwards/left/right direction as well as in an up/down direction. The body 100A should at least be movable in an up direction in addition to the movement in the same plane as the direction of movement of the robotic work tool.

This enables the body 100A to move relative the chassis 100B both when a collision occurs, and when the robotic work tool is (at least partially) lifted. As a user lifts the robotic work tool 100, he will most likely do so by grabbing the body 100A and lift. The body 100A will therefore move up from the chassis 100B initially before the elastic fittings are stretched enough to lift the chassis 100B.

The lift/collision detection sensor 190 is arranged between the body 100A and the chassis 100B. In FIG. 3, the lift/collision detection sensor is shown as comprising a first part 190A and a second part 190B. In FIG. 3 the first part 190A is shown as the upper part 190A, and the second part 190B is shown as a lower part 190B. The upper part 190A is attached to the body 100A and the lower part is attached to the chassis 100B. A movement of the body 100A relative the chassis 100B will thus be translated to a movement of the upper part 190A of the lift/collision detection sensor 190 relative the lower part 190B of the lift/collision detection sensor 190.

Figure 4:
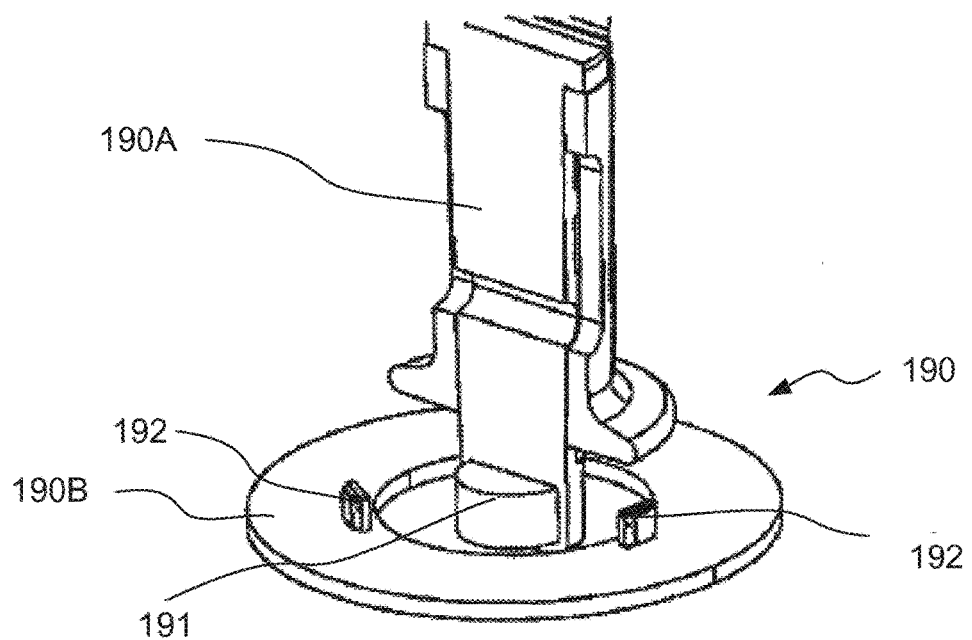
FIG. 4 shows a schematic isometric view of a robotic work tool arranged with a lift/collision detection sensor according to one embodiment of the teachings of this application.

FIG. 4 shows a schematic view of a lift/collision detection sensor 190 according to one embodiment of the teachings of this application. The lower part 190B is arranged with at least two sensing elements 192', 192", a first sensing element 192' and a second sensing element 192". The at least two sensing elements 192', 192" are arranged in an array, a sensor element array. In one embodiment each sensing element 192', 192" is a magnetic sensor such as a Hall sensor. In one embodiment the polarity element 191 is a magnet.

In the example situation illustrated in FIG. 4, two sensing elements 192', 192" are arranged on the lower part 190B of the lift/collision detection sensor 190. It should be noted that the array of sensing elements 192 may alternatively be arranged in the upper part 190A and the polarity element 191 being arranged in the lower part 190B, although not shown explicitly. Furthermore, it should be noted that the lift/collision detection sensor may comprise 3, 4, 5 or more sensing elements as should be understood by a skilled person after taking part of the teachings herein for being able to detect different forms of collisions and/or lifts. The disclosure herein will however focus on using a first and a second sensing element. Here, the lower part 190B is a ring array board having a disc-shaped form. The two sensing elements 192', 192" are arranged along a radius of the ring array board. By arranging the sensing elements 192', 192" along a circumference of the ring array board, an axis of rotation will be less influenced by vibrations during operation and a smoother movement of the working tool 100 will be achieved. The polarity element 191 is arranged on the upper part 190A of the lift/collision detection sensor. As can be seen in FIG. 4, the polarity element 191 can be moved in a longitudinal direction, thus moving up/down in relation to the sensing elements 192', 192" on the lower part 190B of the lift/collision detection sensor 190.

In one embodiment the polarity element 191 is a magnet having a north and a south pole, wherein the north pole is often referred to as a negative pole − and the south pole as a positive pole +. The magnet creates a magnetic field. The magnetic field created above the centre point of the magnet (the dotted line in FIG. 5A-C) has a first polarity and the magnetic field created below the centre point of the magnet has a second polarity.

Each sensing element 192', 192" is configured to detect a switch in the magnetic field, i.e. a polarity change, occurring due to tilting (collision) or lifting of the polarity element 191 in the robotic work tool 100. A switch in the magnetic filed occurs when the polarity element 191 is moved in relation to the any of the sensing elements 192', 192", as will be described more in detail in conjunction to FIGS. 5B and C.

Figure 5A:
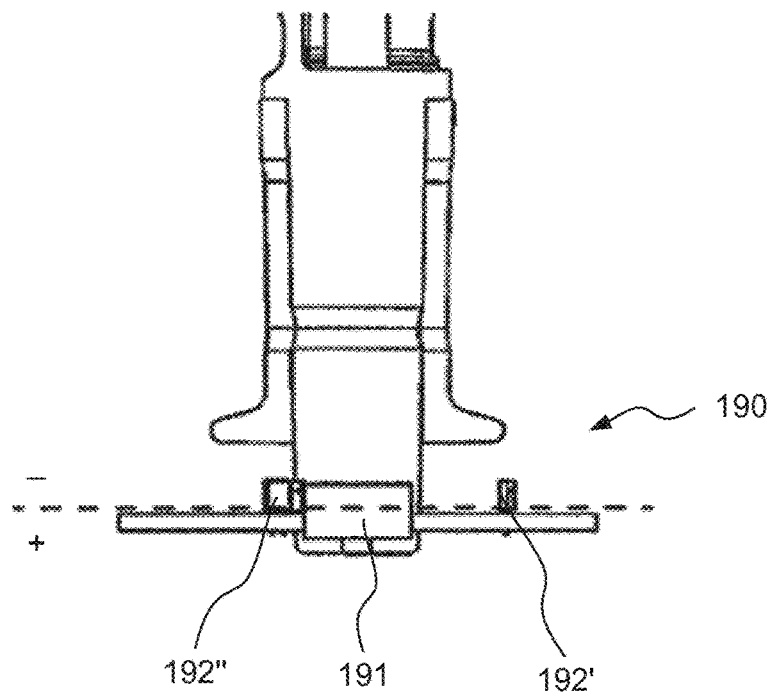
FIGS. 5A, 5B and 5C each shows a schematic view of a lift/collision detection sensor according to one embodiment of the teachings of this application.

In the example situation illustrated in FIG. 5A, the robotic work tool 100 is operating under normal conditions where both the first sensing element 192' and the second sensing element 192" are located on the same side of centre point of the polarity element 191. The polarity of the sensing elements 192', 192" is therefore the same, e.g. a first polarity. The first sensing element 192' and the second sensing element 192" thus detects the same polarity.

Figure 5B:
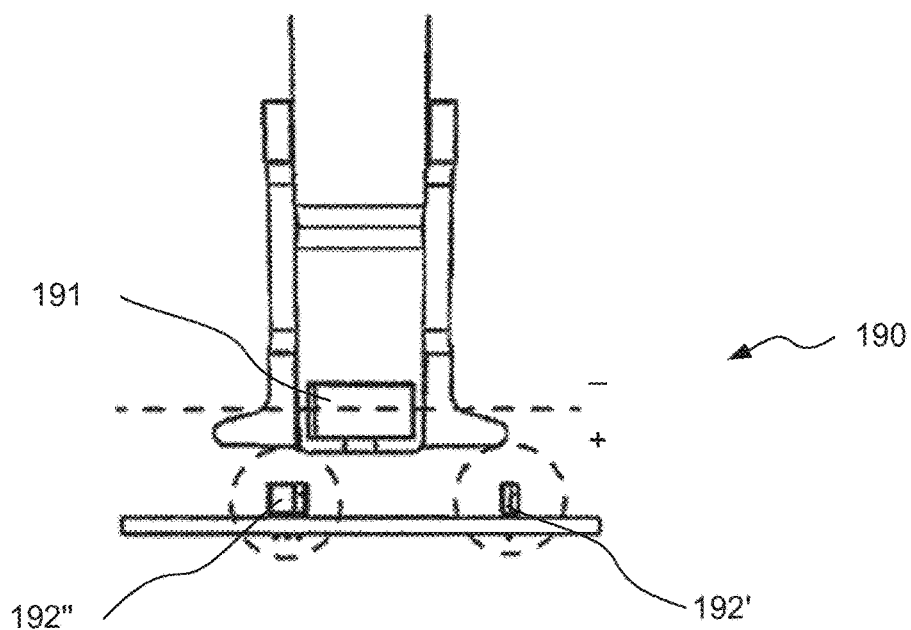

FIG. 5B shows a schematic view of the lift/collision detection sensor 190 during a lifting event. As a user lifts the robotic work tool 100, he or she most likely grabs the body 100A, possibly in a handle (not shown). The lifting thus results in a movement of the body 100A up and away from the chassis 100B, at least in one end of the robotic work tool 100 in the case of a partial lift. As the body 100A moves away from the chassis 100B, the upper part 190A of the lift/collision detection sensor 190 will move up and away from the lower part 190B of the lift/collision detection sensor 190. This results in a movement of the polarity element 191 away from the first sensing element 192' and the second sensing element 192" in a z-direction. Due to the movement of the polarity element 191 in the z-direction, the magnetic field detected by the sensing elements 192', 192" will be changed. All the sensing elements will change polarity, e.g. change from being closest to the north side of the magnet 191 to being closest to the south side of the magnet 191. Hence, when moving the polarity element 191 upwards, the first sensing element 192' and the second sensing element 192" both detect a change in polarity, e.g. from a first polarity to a second polarity.

The controller 110 is thus configured to determine that the robotic work tool 100 is being lifted (at least partially) by detecting a switch in the magnetic field caused by a polarity change. In order for the controller 110 to detect a lift, a change in polarity must be detected in both the sensing elements 192', 192".

The controller 110 is also configured to discontinue any operation in response to detecting that the robotic work tool 100 is being lifted. In one embodiment the controller 110 is configured to deactivate or stop the work tool 160 to safe guard against any damages or injuries occurring during the lift.

Figures 5C, 6:
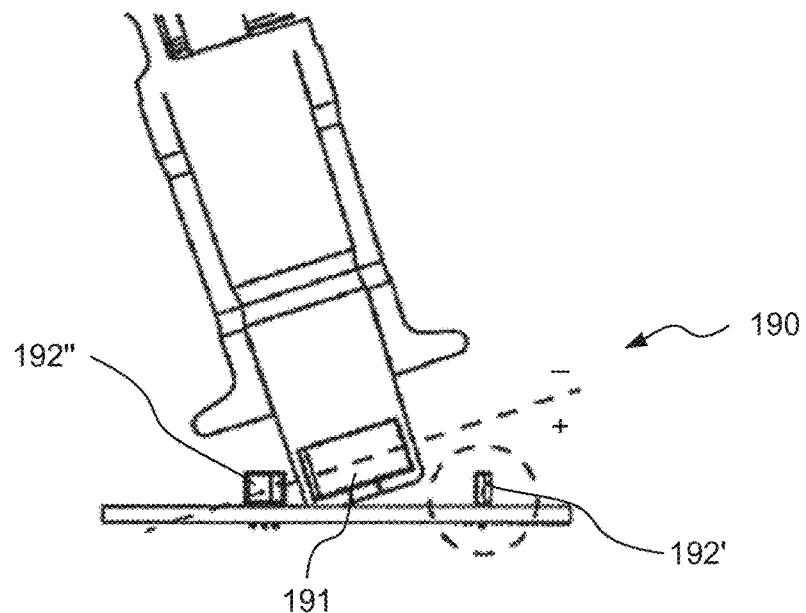
FIG. 6 shows a schematic overview of a plurality of sensing elements according to one embodiment of the teachings of this application.

FIG. 5C shows a schematic view of the lift/collision detection sensor 190 during a collision. As the body 100A is movable relative the chassis 100B, the body 100A will move slightly during the collision. As has been explained above, this results in a movement of the upper part 100A relative the lower part 190B of the lift/collision detection sensor 190 in a xy-direction. This is in turn causes the polarity element 191 to move relative the at least two sensing elements 192', 192".

In the example of FIG. 5C, the first sensing element 192' is no longer located on the same side of the centre point of the polarity element 191 as the second sensing element 192" and will thus not be in the same polarity field (e.g. change from being closest to the north side of the magnet 191 to being closest to the south side of the magnet 191). The polarity of at least one of the sensing elements 192', 192" has therefore been changed, for example from a first polarity to a second polarity. The first sensing element 192' thus detects a change in polarity, but the second sensing element 192" does not.

The controller of the robotic work tool 100 is thus configured to determine that a collision has been detected by detecting a switch in the magnetic field caused by a polarity change. The controller 110 is also configured to change a direction of movement for the robotic work tool 100 in response to detecting the collision. The robotic work tool 100 can thus continue operating away from or around an obstacle that the robotic work tool 100 has collided with.

It is beneficial to be able to accurately determine if a lift and/or a collision has occurred in order for the robotic work tool to take the appropriate action (e.g. deactivate or stop the robotic work tool if a lift is detected and change a direction of movement if a collision is detected). Hence, an accurate determination between a lift and a collision increases the effectiveness of the work tool as well as increasing the safety of the user.

In FIG. 6 a table showing a schematic representation of an embodiment of the lift/collision detection sensor 190 is shown. In this embodiment, there are four sensing elements 192 (here referenced S1, S2, S3, S4) being Hall sensors and one first sensor being a magnet 191. During normal mode of the robotic work tool 100, all the sensing elements 192 are located on the north polarity field (−), thus detecting a first polarity.

During lift mode, i.e. when the robotic work tool is lifted in a z-direction, all the sensing elements S1, S2, S3, S4 are located on the south polarity field (+), detecting a second polarity. Hence, a change in polarity from a first polarity to a second polarity is detected and thus a lift event is detected.

During collision mode, when the robotic work tool 100 is tilted in a xy-direction, at least one, but not all, of the sensor elements S1, S2, S3, S4 will be located in the south polarity field. As can be seen in FIG. 6, different combinations might occur causing the controller to detect a collision. For example, S1, S2 and S3 may all detect a second polarity, whereas S4 detects a first polarity. Another example of a collision is when S1, S4 detects a first polarity and S2, S3 detects a second polarity.

It should be noted that it is possible to achieve a satisfactory lift/collision detection using only one lift/collision detection sensor 190 adapted according to the teachings herein. However, the number of lift/collision detection sensors 190 may vary depending on the structure of the robotic work tool 100, as could be seen in FIG. 1 where four lift collision detection sensors 190 are arranged on each corner of the robotic work tool 100

In the event of arranging a plurality of lift/collision detection sensors 190 in the robotic work tool 100, a detected lift has a higher priority than a detected collision, since a lift is a more severe action. If at least one lift/collision detection sensor 190 detects a lift, the controller will detect a lift for the robotic work tool 100. For example, in one embodiment having three lift/collision detection sensors 190, two of the sensors 190 detect a collision and the third detects a lift, the resulting event will be a lift. If one of the lift/collision sensors 190 detects a lift, the controller will detect a lift for the robotic work tool 100. However, if at least one of the lift/collision sensors 190 detects a collision, while none of the lift/collision sensors 190 detects a lift, the controller will detect a collision for the robotic work tool 100. Furthermore, if all three lift/collision detection sensors 190 were to detect a collision, the resulting event would be a collision.

Hence, if a lift is detected in at least one of the lift/collision detection sensors 190, a lift event is detected by the robotic work tool 100. If a collision is detected in at least one of the plurality of lift/collision detection sensors 190 while not detecting a lift in any of the other lift/collision detection sensors 190, a collision event is detected by the robotic work tool 100.

In one embodiment, one lift/collision detection sensor 190 is arranged at the front end and one lift/collision detection sensor 190 is arranged at the rear end of the robotic work tool 100. This arrangement ensures that the controller can detect a (partial) lift in either end. In one embodiment, as can be seen in FIG. 1, the robotic work tool 100 is arranged with four lift/collision detection sensors 190, one adjacent each corner of the robotic work tool 100, for detecting partial lifts close to a corner. The plurality of lift/collision detection sensor 190 may also be arranged one at each side of the robotic work tool 100, each one arranged on the centre point of each side.

Although the FIGS. 4, 5A, 5B and 5C show a lift/collision detection sensor 190 having two sensing elements 192, it is also possible to implement a lift/collision detection sensor 190 according to herein with other numbers of sensing elements 192, and also in other arrangements. The number of and arrangements of the sensing elements 192 may be chosen by a robotic work tool designer based on the size of the robotic work tool, the strength of the magnet and the sensitivity of the sensors, as well as the freedom to move of the body 100A respectively the upper part 190A of the lift/collision detection sensor 190.

Figure 7:
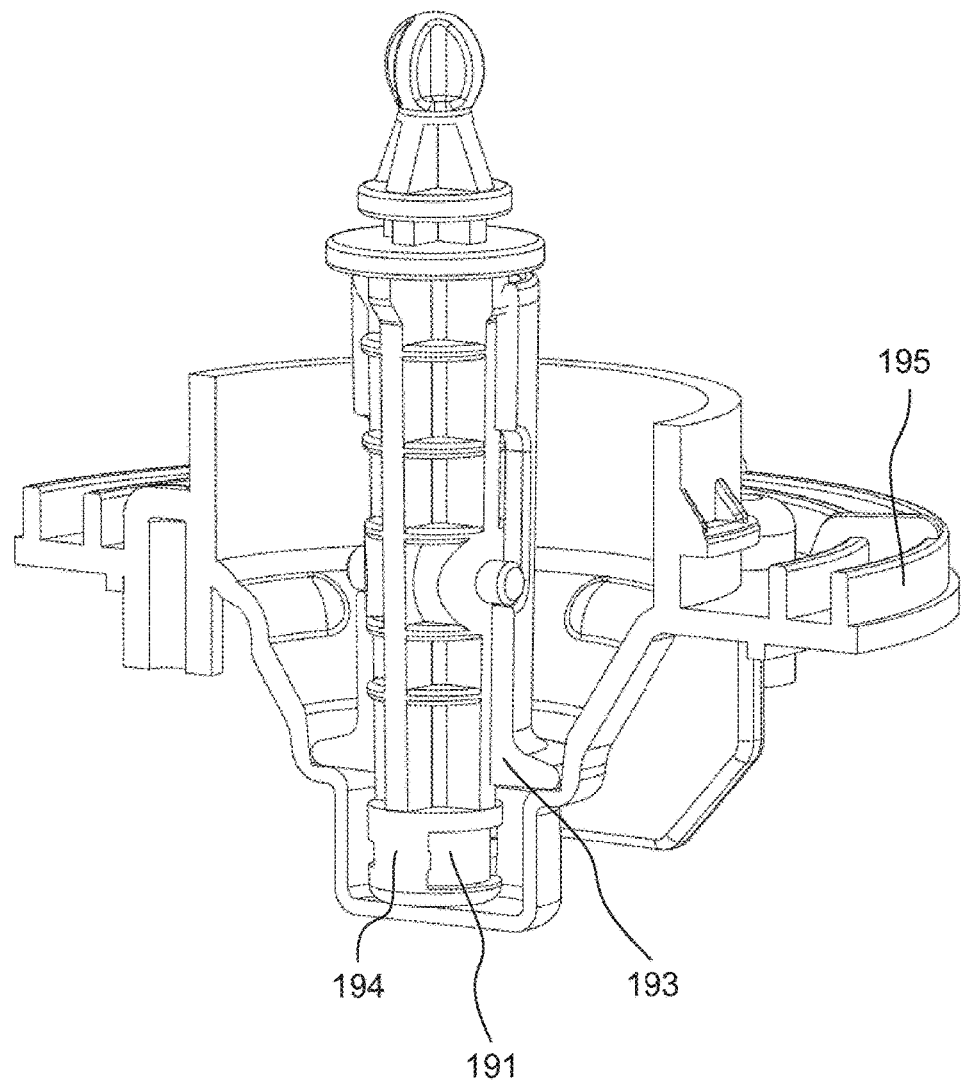
FIG. 7 shows a schematic detailed view of an upper part of a robotic work tool arranged with a lift/collision detection sensor according to one embodiment of the teachings of this application.

FIG. 7 shows a detailed view of an embodiment of the upper part 190A of a robotic work tool. The upper part 190A comprises a joystick element 193 and a lifting column 194. The lifting column 194 is cylindrical stored in the joystick element 193 and a polarity element 191 is rigidly clamped in the column 194. The joystick element 193 is pressed in a housing 195 and can tilt back and forth. During the tilting of the joystick element 193, the lifting column 194 and thus the polarity element 191 tilts accordingly. In the event of a lift, the lifting column 194 inside the joystick element 193 moves while the joystick element 193 remains stationary.

The relationship between the maximum deflection of the joystick element 193 and the distance between the pivot axis, the polarity element 191, and the lift/collision detection sensor(s) 190 determines how small angles and movements that could be detected. Small angles thus requires that the polarity element 191 is very close to the center of the sensors in height, which then allows for a very high sensitivity for detecting lifts.

The size of the polarity element 191 may depend on the size of the robotic work tool 100. For example, a robotic work tool 100 of a greater size requires a bigger sized polarity element 191, so as to be able to separate a bump (as usual during normal working conditions) from a detected lift. In one embodiment, the movable parts of the robotic work tool 100 needs to move a distance of half the distance of the length of the polarity element 191 (e.g. half the length of a magnet) in order to detect a switch in the magnetic field. The size of the sensor elements may also depend on the proposed or intended operation of the robotic work tool.

The distance between sensing elements 192, the distance from the polarity element 191 to the sensing elements 192 as well as the distance between the lift/collision detection sensors 190 (if more than one) may depend on the size of the robotic work tool 100, as well as the freedom to move of the body 100A respectively the upper part 190A of the lift/collision detection sensor 190, and the strength of the magnets.

In the embodiment of FIGS. 4 and 5, there are two sensing elements 192 in the array. The sensing elements 192 are Hall sensors, digital and/or analogue, and the magnet may be a ferrite magnet and/or neodyne magnet.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system comprising a robotic work tool comprising a lift/collision detection sensor, said lift/collision detection sensor comprising a polarity element and at least a first sensing element and a second sensing element, wherein the polarity element has a first and a second polarity and wherein the first and second sensing elements are configured to each sense a polarity of the first polarity element, wherein said robotic work tool is configured to
    detect a polarity change in the first sensing element and in the second sensing element and in response thereto determine that a lift has been detected, or
    detect a polarity change in the first sensing element but not in the second sensing element and in response thereto determine that a collision has been detected.

2. The robotic work tool system according to claim 1, wherein said polarity element is movably arranged with respect to said first sensing element and said second sensing element, so that a polarity change can be detected during a lift and/or collision.

3. The robotic work tool system according to claim 1, wherein the polarity element is a magnet and wherein said first sensing element and said second sensing element are hall sensors.

4. The robotic work tool system according to claim 1, wherein the robotic work tool further comprises a body and a chassis, wherein said body is attached to said chassis by means of elastic fittings.

5. The robotic work tool system according to claim 4, wherein said body is movable both in a direction in a same plane as a direction of movement of the robotic work tool as well as in a direction perpendicular to such a plane.

6. The robotic work tool system according to claim 4, wherein said polarity element is arranged in said body and said at least two sensing elements is arranged in said chassis.

7. The robotic work tool system according to claim 4, wherein said polarity element is arranged in said chassis and said at least two sensing elements is arranged in said body.

8. The robotic work tool system according to claim 1, wherein the lift/collision detection sensor further comprises one or more third sensing elements.

9. The robotic work tool system according to claim 1, wherein the robotic work tool comprises only one lift/collision detection sensor.

10. The robotic work tool system according to claim 1, wherein the robotic work tool comprises a plurality of lift/collision detection sensors.

11. The robotic work tool system according to claim 10, wherein the robotic work tool is further configured to:

detect a lift in at least one of the lift/collision detection sensors and in response thereto determine that a lift has been detected for the robotic work tool, or detect a collision in at least one of the plurality of lift/collision detection sensors while not detecting a lift in any of the other lift/collision detection sensors and in response thereto determine that a collision has been detected for the robotic work tool.

12. The robotic work tool system according to claim 1, wherein the robotic work tool is a robotic lawnmower.

13. The robotic work tool system according to claim 1, wherein the robotic work tool is a farming equipment, a vacuum cleaner, a floor cleaner, a street sweeper, a snow removal tool, a golf ball retriever robot, a cleaner robot, a leaves blower robot, a leaves collector robot, snow thrower robot, a demolition robot or a mine clearance robot.

14. A method for use in a robotic work tool system comprising a robotic work tool comprising a lift/collision detection sensor, said lift/collision detection sensor comprising a polarity element and at least a first sensing element and a second sensing element, wherein the polarity element has a first and a second polarity and wherein the first and second sensing elements are configured to each sense a polarity of the first polarity element, wherein said method comprises:

detecting a polarity change in the first sensing element and in the second sensing element and in response thereto determine that a lift has been detected, or detecting a polarity change in the first sensing element but not in the second sensing element and in response thereto determine that a collision has been detected.

15. The method according to claim 14, wherein said polarity element is movably arranged with respect to said at least two sensing elements.

* * * * *